(12) United States Patent
Bono

(10) Patent No.: US 8,206,863 B2
(45) Date of Patent: Jun. 26, 2012

(54) FUEL CELL SYSTEM AND ITS TEMPERATURE ADJUSTING METHOD

(75) Inventor: Tetsuya Bono, Aichi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1047 days.

(21) Appl. No.: 12/083,102

(22) PCT Filed: Nov. 10, 2006

(86) PCT No.: PCT/JP2006/322908
§ 371 (c)(1),
(2), (4) Date: Apr. 4, 2008

(87) PCT Pub. No.: WO2007/058283
PCT Pub. Date: May 24, 2007

(65) Prior Publication Data
US 2009/0136804 A1 May 28, 2009

(30) Foreign Application Priority Data
Nov. 21, 2005 (JP) .................................. 2005-336067

(51) Int. Cl.
*H01M 8/04* (2006.01)
(52) U.S. Cl. ......... 429/433; 429/442; 429/444; 429/430
(58) Field of Classification Search .................. 429/433, 429/442, 443, 444, 430, 431, 432, 452; 700/299, 700/300, 291
See application file for complete search history.

(56) References Cited

U.S. PATENT DOCUMENTS

| 7,882,051 | B2 * | 2/2011 | Matsumoto et al. ............ 706/23 |
| 2002/0164511 | A1 * | 11/2002 | Uozumi ......................... 429/24 |
| 2005/0227131 | A1 | 10/2005 | Ueda et al. |

FOREIGN PATENT DOCUMENTS

| DE | 10 2004 024 117 A1 | 12/2004 |
| JP | 10-340734 A | 12/1998 |
| JP | 2002-184435 A | 6/2002 |
| JP | 2003-109637 A | 4/2003 |
| JP | 2003-168454 A | 6/2003 |
| JP | 2003-267065 A | 9/2003 |
| JP | 2004-119044 A | 4/2004 |
| JP | 2004-179123 A | 6/2004 |
| JP | 2004-179127 A | 6/2004 |
| JP | 2004-257821 A | 9/2004 |
| JP | 2004-342430 A | 12/2004 |
| JP | 2005-5040 A | 1/2005 |
| JP | 2005-190704 A | 7/2005 |
| JP | 2005-259402 | * 9/2005 |

(Continued)

*Primary Examiner* — Raymond Alejandro
(74) *Attorney, Agent, or Firm* — Kenyon & Kenyon LLP

(57) ABSTRACT

A fuel cell system having a fuel cell, coolant circulating means which circulates cooling water into the fuel cell, temperature sensors which detect a cooling water outlet temperature and a cooling water inlet temperature, and temperature adjusting means which adjusts a temperature of the fuel cell by controlling a flow rate of the coolant on the basis of the cooling water outlet temperature, is characterized by including abnormality determining means which determines whether or not abnormality occurs in the temperature sensor, and coolant temperature estimating means which, when the abnormality determining means determines that abnormality occurs in the temperature sensor, estimates the cooling water outlet temperature on the basis of physical information relating to operating states of the fuel cell.

8 Claims, 4 Drawing Sheets

FOREIGN PATENT DOCUMENTS

| | | |
|---|---|---|
| JP | 2005-259402 A | 9/2005 |
| JP | 2006-12564 A | 1/2006 |
| JP | 2006-156056 A | 6/2006 |
| JP | 2006-172962 A | 6/2006 |
| JP | 2006-309974 A | 11/2006 |
| JP | 2006-332002 A | 12/2006 |

* cited by examiner

FUEL CELL SYSTEM AND ITS TEMPERATURE ADJUSTING METHOD

This is a 371 national phase application of PCT/JP2006/322908 filed 10 Nov. 2006, which claims priority of Japanese Patent Application No. 2005-336067 filed 21 Nov. 2005, the contents of which are incorporated herein by reference.

TECHNICAL FIELD

The present invention relates to a fuel cell system and a temperature adjusting method of the fuel cell system.

BACKGROUND ART

At present, there is practically used a fuel cell system which generates electric power by supplying fuel gas to an anode electrode of a fuel cell and oxidizing gas to a cathode electrode and causing an electrochemical reaction. In a fuel cell of such fuel cell system, since heat is generated during the electrochemical reaction (power generation), the power generation efficiency may be reduced by the heat. For this reason, by providing a cooling mechanism for cooling the fuel cell, the operating temperature of the fuel cell is maintained to a suitable temperature range to thereby suppress the reduction of the power generation efficiency.

As a conventional cooling mechanism, there is proposed a type which is constituted by a coolant passage for circulating coolants (cooling water and the like) into a fuel cell, a pump for circulating the coolant, a radiator and a fan for cooling the hot coolant discharged from the fuel cell, a temperature sensor for detecting a temperature of the coolant, a control device for controlling the pump and the fan on the basis of the detected coolant temperature, and the like.

Further, in recent years, there has been proposed a technique which detects a temperature (inlet temperature) of a coolant flowing into a fuel cell and a temperature (outlet temperature) of the coolant discharged from the fuel cell by temperature sensors, and which detects abnormality of a cooling mechanism and controls a flow rate of the coolant on the basis of the detected temperatures (see, for example, a Japanese Patent Laid-Open No. 2003-109637). By adopting such technique, it is possible to adjust the temperature of the fuel cell on the basis of the inlet temperature and outlet temperature of the coolant.

DISCLOSURE OF THE INVENTION

However, in the case where the technique as disclosed in the above described patent gazette document is adopted, there is a problem that, when abnormality occurs in the temperature sensor itself, the inlet temperature and outlet temperature of the coolant are made unclear, thereby making it difficult or impossible to detect abnormality of the cooling mechanism and control the flow rate of coolant, as a result of which the temperature of the fuel cell cannot be controlled.

The present invention has been made in view of the above described circumstances. An object of the present invention is to improve the reliability of a fuel cell system, which adjusts a temperature of a fuel cell on the basis of a temperature of a coolant detected by a temperature sensor, by realizing a state where the adjustment of the temperature can be continued even when abnormality occurs in the temperature sensor.

In order to achieve the above described object, a fuel cell system according to the present invention, provided with a fuel cell, coolant circulating means which circulates a coolant into the fuel cell, a temperature sensor which detects a temperature of the coolant, and temperature adjusting means which adjusts a temperature of the fuel cell by controlling circulation states of the coolant on the basis of the temperature of the coolant discharged from the fuel cell, is characterized by including abnormality determining means which determines whether or not abnormality occurs in the temperature sensor, and coolant temperature estimating means which, when the abnormality determining means determines that abnormality occurs in the temperature sensor, estimates the temperature of the coolant discharged from the fuel cell on the basis of physical information relating to operating states of the fuel cell.

According to such configuration, even when abnormality occurs in the temperature sensor, it is possible to estimate the outlet temperature of the coolant on the basis of the physical information relating to the operating states of the fuel cell. Thus, it is possible to adjust the temperature of the fuel cell by controlling circulation states (flow rate and temperature) of the coolant on the basis of the estimated outlet temperature of the coolant. That is, even when abnormality occurs in the temperature sensor, it is possible to effect the temperature control of the fuel cell.

The above described fuel cell system may also be constituted in such a manner that, when the abnormality determining means determines that abnormality occurs in the temperature sensor, the coolant temperature estimating means estimates the temperature of the coolant flowing into the fuel cell on the basis of physical information relating to operating states of the fuel cell, and the temperature adjusting means adjusts the temperature of the fuel cell by controlling the temperature of the coolant flowing into the fuel cell on the basis of the temperature of the coolant flowing into the fuel cell.

According to such configuration, even when abnormality occurs in the temperature sensor, it is possible to estimate the inlet temperature of the coolant on the basis of the physical information relating to the operating states of the fuel cell. Thus, it is possible to adjust the temperature of the fuel cell by controlling the temperature of the coolant flowing into the fuel cell on the basis of the estimated inlet temperature of the coolant. That is, even when abnormality occurs in the temperature sensor, it is possible to effect the temperature control of the fuel cell.

Further, in the above described fuel cell system, the temperature sensor is preferably capable of detecting both of the temperature of the coolant flowing into the fuel cell and the temperature of the coolant discharged from the fuel cell.

Further, in the above described fuel cell system, as the physical information relating to the operating states of the fuel cell, it is possible to adopt information relating to the power generation amount of the fuel cell (for example, information relating to at least one of electric power, voltage, and current of the fuel cell), and/or information relating to the amount of reaction gas (fuel gas, oxidizing gas) supplied to the fuel cell.

Further, in the above described fuel cell system, the coolant temperature estimating means may estimate the temperature of the coolant discharged from the fuel cell by using information relating to the temperature of the coolant flowing into the fuel cell.

Further, in the above described fuel cell system, it is possible to constitute the fuel cell by laminating a plurality of unit cells performing power generation. In this case, the coolant temperature estimating means is capable of estimating the temperature of the coolant discharged from the fuel cell by referring to at least one of the heat transfer rate from the power generating section in the unit cell to the coolant, the heat radiation amount of the unit cell, and the heat capacity of the fuel cell.

Further, the above described fuel cell system may also be provided with an operation stopping means which stops the operation of the fuel cell, when the abnormality determining means determines that abnormality occurs in the temperature sensor and both of the temperature of the coolant flowing into the fuel cell and the temperature of the coolant discharged from the fuel cell cannot be detected.

According to such configuration, when abnormality occurs in the temperature sensor and both of the inlet temperature and outlet temperature of the coolant cannot be detected, it is possible to stop the operation of the fuel cell, and to thereby reduce the possibility of giving a damage to the fuel cell.

Further, it is also possible to provide a movable body having the fuel cell system according to the present invention. The movable body having such constitution is provided with a highly reliable fuel cell system, and hence has a high safety.

Further, according to the present invention, a temperature adjusting method of a fuel cell system which is provided with a fuel cell, coolant circulating means for circulating a coolant into the fuel cell, and a temperature sensor for detecting a temperature of the coolant, includes: a first step of determining whether or not abnormality occurs in the temperature sensor; a second step of, when it is determined in the first step that abnormality occurs in the temperature sensor, estimating a temperature of the coolant discharged from the fuel cell on the basis of physical information relating to operating states of the fuel cell; and a third step of adjusting a temperature of the fuel cell by controlling circulation states of the coolant on the basis of the temperature of the coolant estimated in the second step.

According to such method, even when abnormality occurs in the temperature sensor, the outlet temperature of the coolant can be estimated on the basis of the physical information relating to the operating states of the fuel cell. Thus, the temperature of the fuel cell can be adjusted by controlling the circulation states (flow rate and temperature) of the coolant on the basis of the estimated outlet temperature of the coolant. That is, even when abnormality occurs in the temperature sensor, it is possible to effect the temperature control of the fuel cell.

The above described temperature adjusting method of the fuel cell system may also include: a fourth step of, when it is determined in the first step that abnormality occurs in the temperature sensor, estimating a temperature of the coolant flowing into the fuel cell on the basis of physical information relating to operating states of the fuel cell; and a fifth step of adjusting the temperature of the fuel cell by controlling the temperature of the coolant flowing into the fuel cell on the basis of the temperature of the coolant estimated in the fourth step.

According to such method, even when abnormality occurs in the temperature sensor, it is possible to estimate the inlet temperature of the coolant on the basis of the physical information relating to the operating states of the fuel cell. Thus, it is possible to adjust the temperature of the fuel cell by controlling the temperature of the coolant flowing into the fuel cell on the basis of the estimated inlet temperature of the coolant. That is, even when abnormality occurs in the temperature sensor, it is possible to effect the temperature control of the fuel cell.

According to the present invention, in a fuel cell system which adjusts a temperature of a fuel cell on the basis of a temperature of a coolant detected by a temperature sensor, it is possible to realize a state where the temperature control of the fuel cell can be continued even when abnormality occurs in the temperature sensor, to thereby improve the reliability of the system.

BEST MODE FOR CARRYING OUT THE INVENTION

In the following, a fuel cell system according to an embodiment of the present invention will be described with reference to the accompanying drawings. In the present embodiment, there is described an example in which the present invention is applied to an on-vehicle power generation system of a fuel cell vehicle.

Figure 1:
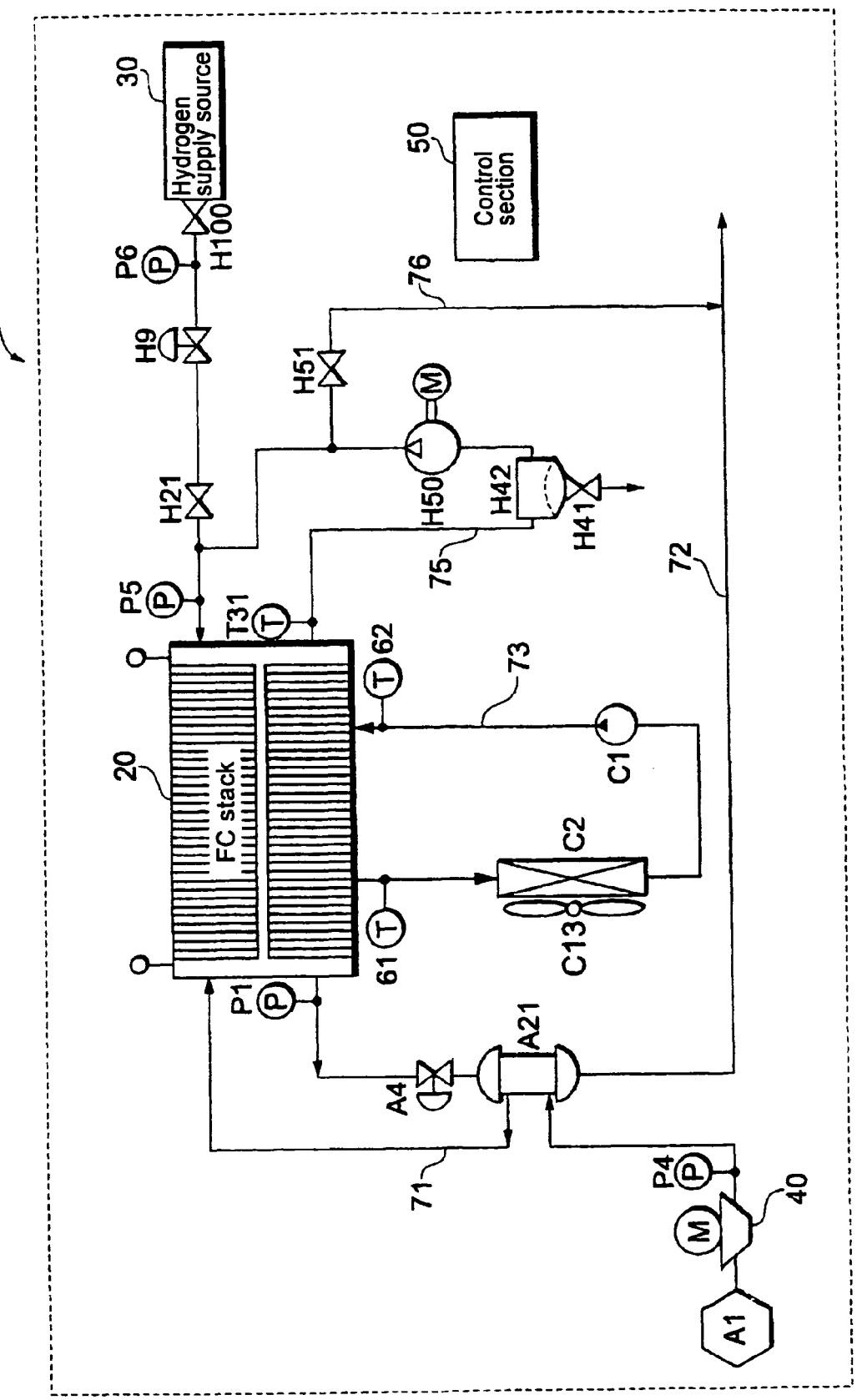
FIG. 1 is a figure showing a constitution of a fuel cell system according to an embodiment of the present invention.

First, a constitution of a fuel cell system 1 according to the present embodiment is explained by using FIG. 1. The fuel cell system 1 is constituted by including a fuel cell 20 generating electric power by being supplied with reaction gases (fuel gas and oxidizing gas), a hydrogen supply source 30 for supplying hydrogen gas as the fuel gas to the fuel cell 20, a compressor 40 for supplying air as the oxidizing gas to the fuel cell 20, coolant circulating means (cooling water flow passage 73 and the like) circulating a coolant into the fuel cell 20, a control section 50 integrally controlling the whole system, and the like.

The fuel cell 20 is constituted as a stack by laminating a required number of unit cells, each of which generates electric power by being supplied with the fuel gas and the oxidizing gas. The electric power generated by the fuel cell 20 is supplied to a power control unit (not shown). The power control unit is equipped with an inverter which drives a drive motor of the vehicle, an inverter which drives various kinds of auxiliary apparatuses, such as a compressor motor and a motor for hydrogen pump, a DC-DC converter which charges power storage means such as a secondary battery and supplies electric power from the power storage means to the motors, and the like.

As shown in FIG. 1, air (outside air) as the oxidizing gas is supplied to an air supply port of the fuel cell 20 via an air supply passage 71. As shown in FIG. 1, the air supply passage 71 is provided with an air filter A1 which removes fine particles from the air, the compressor 40 which pressurizes the air, a pressure sensor P4 which detects the pressure of the supplied air, a humidifier A21 which adds a required amount of water to the air, and the like. The compressor 40 is driven by a motor M which is driven and controlled by the control section 50.

The air off-gas discharged from the fuel cell 20 is exhausted to the outside through an exhaust passage 72. As shown in FIG. 1, the exhaust passage 72 is provided with a pressure sensor P1 which detect an exhaust pressure, a pressure regulating valve A4, a heat exchanger of a humidifier A21, and the like. The pressure sensor P1 is provided in the vicinity of an air exhaust port of the fuel cell 20. The pressure regulating valve A4 functions as a pressure regulator (pressure reducing device) which sets the pressure of the air supplied to the fuel cell 20. Signals detected by the pressure sensors P4 and P1 are transmitted to the control section 50. The number of revolutions of the motor of the compressor 40 and the opening area of the pressure regulating valve A4 are controlled by the control section 50, so that the supply air pressure and the supply air flow rate to the fuel cell 20 are set.

As shown in FIG. 1, hydrogen gas as the fuel gas is supplied from the hydrogen supply source 30 to a hydrogen supply port of the fuel cell 20 via a fuel supply passage 74. As the hydrogen supply source 30, for example, a high pressure hydrogen tank may be adopted. Further, a so-called fuel reformer, a hydrogen storage alloy and the like may also be adopted as the hydrogen supply source 30. As shown in FIG. 1, the fuel supply passage 74 is provided with a main stop valve H100 which supplies hydrogen from the hydrogen supply source 30 or stops the supply of hydrogen, a pressure sensor P6 which detects the supply pressure of the hydrogen gas from the hydrogen supply source 30, a hydrogen pressure regulating valve H9 which reduces and adjusts the supply pressure of the hydrogen gas to the fuel cell 20, a shutoff valve H21 which opens and closes a section between the hydrogen supply port of the fuel cell 20 and the fuel supply passage 74, a pressure sensor P5 which detects the inlet pressure of the hydrogen gas in the fuel cell 20, and the like. Signals detected by the pressure sensors P5 and P6 are transmitted to the control section 50, so that the opening/closing operation of each valve is controlled by the control section 50.

Hydrogen gas not consumed in the fuel cell 20 is discharged as hydrogen off-gas to a hydrogen circulation passage 75, and is returned to the downstream side of the shutoff valve H21 of the fuel supply passage 74. As shown in FIG. 1, the hydrogen circulation passage 75 is provided with a temperature sensor T31 which detects the temperature of the hydrogen off-gas, a gas/liquid separator H42 which collects water from the hydrogen off-gas, a water discharge valve H41 which discharges the collected produced water to a tank or the like outside the hydrogen circulation passage 75, a hydrogen pump H50 which pressurizes the hydrogen off-gas, and the like. A signal detected by the temperature sensor T31 is transmitted to the control section 50. The operation of the hydrogen pump H50 is controlled by the control section 50. The hydrogen off-gas is mixed with the hydrogen gas in the fuel supply passage 74, and is supplied to the fuel cell 20 so as to be reused. Further, the hydrogen circulation passage 75 is connected to the exhaust passage 72 by a purge passage 76 via an exhaust control valve H51. The exhaust control valve H51 discharges (purges) the hydrogen off-gas to the outside by being operated by a command from the control section 50. By intermittently performing such purge operation, it is possible to prevent the impurity concentration in the hydrogen gas at the side of the fuel electrode from being increased by repeated circulations of the hydrogen off-gas and the cell voltage from being lowered.

As shown in FIG. 1, the cooling water flow passage 73 which circulates the cooling water as the coolant is connected to cooling water inlet and outlet ports of the fuel cell 20. The cooling water flow passage 73 is provided with a temperature sensor 61 which detects a temperature (hereinafter referred to as "cooling water outlet temperature") of the cooling water discharged from the fuel cell 20, a radiator C2 which dissipates heat of the cooling water to the outside, a pump C1 which pressurizes and circulates the cooling water, a temperature sensor 62 which detects a temperature (hereinafter referred to as "cooling water inlet temperature") of the cooling water flowing into the fuel cell 20, and the like. The radiator C2 is provided with a cooling fan C13 which is rotatably driven by a motor. Signals detected by the temperature sensors 61 and 62 are transmitted to the control section 50, so as to be used for the fuel cell cooling control. Further, the operation of the pump C1 and the cooling fan C13 is controlled by the control section 50. Note that the pump C1 is driven by the control section 50, thereby enabling the cooling water in the cooling water flow passage 73 to be circulated into the fuel cell 20. That is, the control section 50, the pump C1, and the cooling water flow passage 73 constitute an embodiment of the coolant circulating means according to the present invention.

The control section 50 receives a required load such as an accelerator signal of the vehicle (not shown), and control information from the respective sensors (pressure sensors, temperature sensors, and the like) of the fuel cell system, and controls the operation of the respective valves and motors of the respective parts of the system. Note that the control section 50 is constituted by a computer system (not shown). Such computer system is constituted by including a CPU, ROM, RAM, HDD, input/output interface, display and the like, so that the CPU reads and executes various control programs recorded in the ROM to effect the various control operations.

Specifically, the control section 50 detects the cooling water outlet temperature via the temperature sensor 61, and controls the flow rate of the cooling water flowing into the fuel cell 20 by controlling the pump C1 on the basis of the detected cooling water outlet temperature, to thereby adjust the temperature of the fuel cell 20. Further, the control section 50 detects the cooling water inlet temperature via the temperature sensor 62, and controls the temperature of the cooling water flowing into the fuel cell 20 by controlling the cooling fan C13 on the basis of the detected cooling water inlet temperature, to thereby adjust the temperature of the fuel cell 20. That is, the control section 50 is an embodiment of the temperature adjusting means according to the present invention.

Further, the control section 50 determines whether or not abnormality occurs in the temperature sensor 61. When the control section 50 determines that abnormality occurs in the temperature sensor 61 and the cooling water outlet temperature cannot be detected, the control section 50 estimates the cooling water outlet temperature on the basis of information relating to the cooling water inlet temperature and physical information relating to operating states of the fuel cell 20. That is, the control section 50 also functions as an embodiment of the abnormality determining means and the coolant temperature estimating means. Note that the control section 50 which functions as the temperature adjusting means, controls the flow rate of the cooling water flowing into the fuel cell 20 by controlling the pump C1 on the basis of the estimated cooling water outlet temperature, to thereby adjust the temperature of the fuel cell 20.

The physical information used when the cooling water outlet temperature is estimated, may include information relating to the power generation amount of the fuel cell 20 (for example, information relating to electric power of the fuel cell 20, information relating to voltage, information relating to current, and the like), information relating to the reaction gas supply amount (fuel gas supply amount and/or oxidizing gas supply amount) to the fuel cell 20, and the like. Further, when estimating the cooling water outlet temperature, the control section 50 may refer to the heat transfer rate from the power generating section in the unit cell constituting the fuel cell 20 to the coolant, the heat radiation amount of the unit cell, the heat capacity of the fuel cell 20, and the like.

Further, when the control section 50 determines that abnormality occurs in the temperature sensors 61 and 62 and both of the cooling water inlet temperature and the cooling water outlet temperature cannot be detected, the control section 50 stops the operation of the fuel cell 20. That is, the control section 50 also functions as an embodiment of the operation stopping means according to the present invention.

Figure 2:
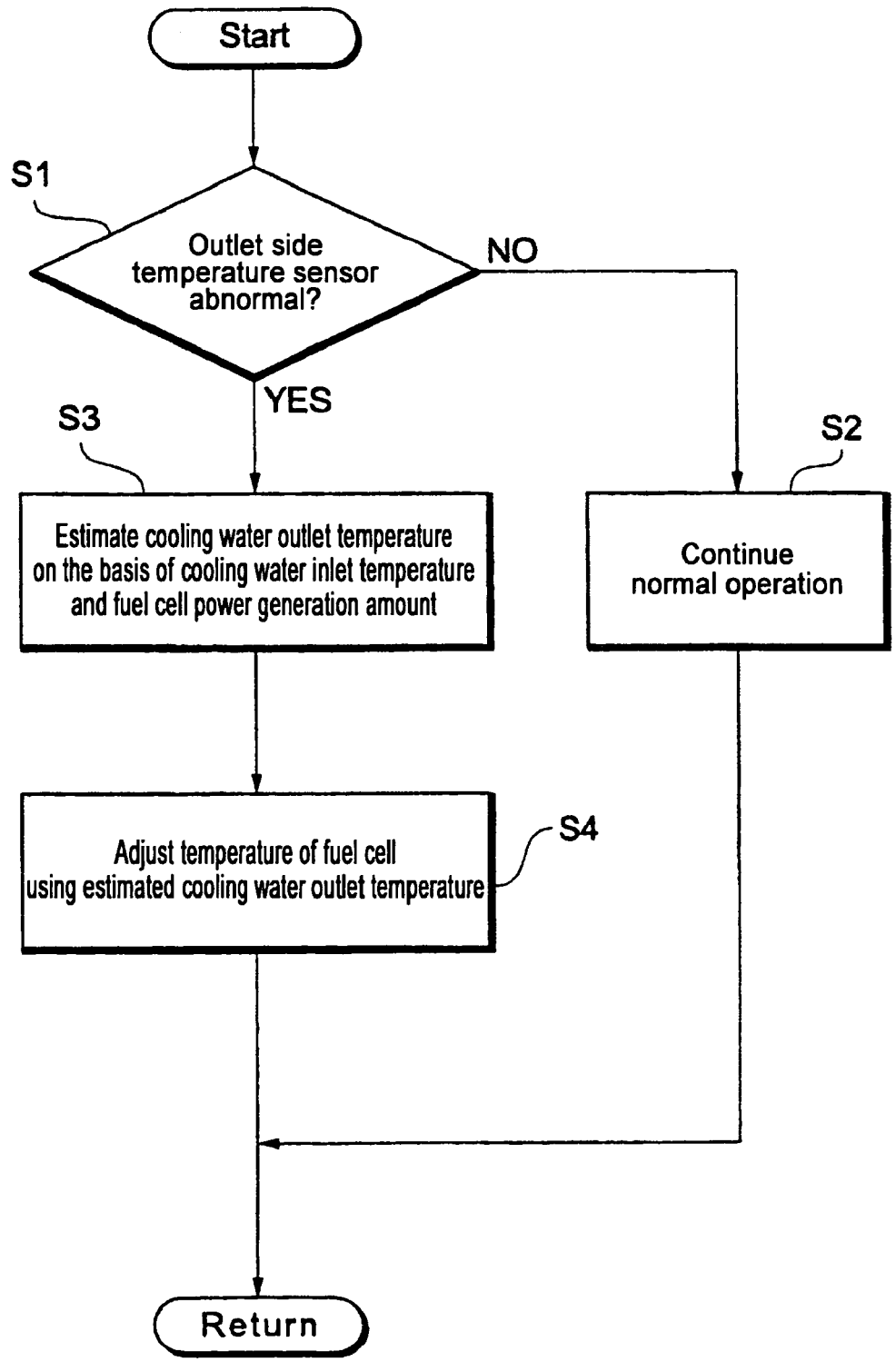
FIG. 2 is a flow chart for explaining a temperature adjusting method of a fuel cell in the fuel cell system shown in FIG. 1.
Figure 3:
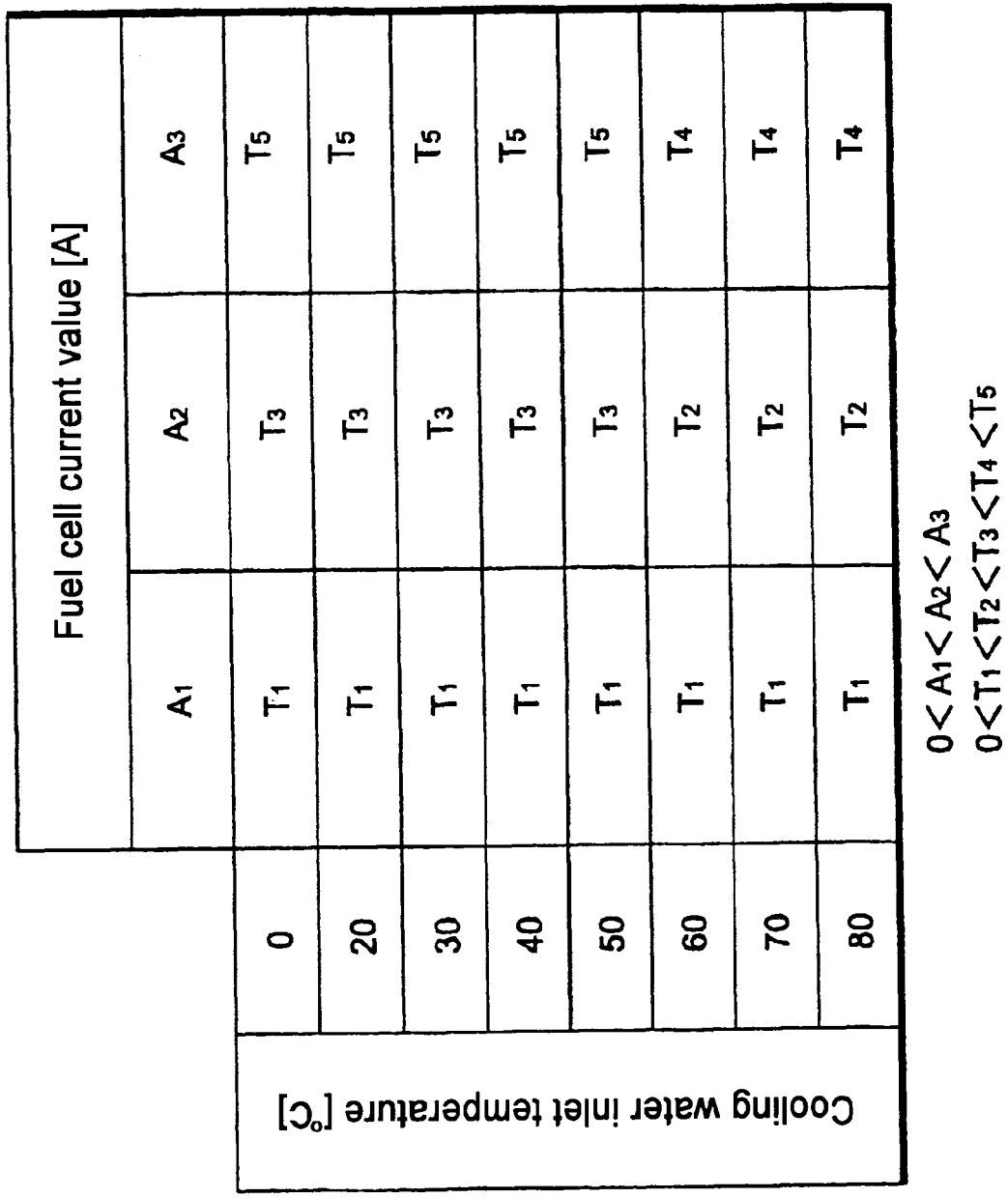
FIG. 3 shows an addition value map used for estimating a cooling water outlet temperature in the temperature adjusting method according to the embodiment of the present invention.

Next, a temperature adjusting method of the fuel cell 20 in fuel cell system 1 according to the present embodiment is explained by using FIG. 2 and FIG. 3.

Note that when the fuel cell system 1 is normally operated, power generation is performed in such a manner that the hydrogen gas is supplied from the hydrogen supply source 30 to the fuel electrode of the fuel cell 20 via the fuel supply passage 74, and the air subjected to humidification adjustment is supplied to the oxidation electrode of the fuel cell 20 via the air supply passage 71. In this case, the electric power (required power) to be led out from the fuel cell 20 is calculated by the control section 50, so that the amounts of hydrogen gas and air corresponding to the power generation amount are supplied to the fuel cell 20. The control section 50 detects the cooling water outlet temperature via the temperature sensor 61, and controls the flow rate of the cooling water flowing into the fuel cell 20 by controlling the pump C1 on the basis of the detected cooling water outlet temperature. Further, the control section 50 detects the cooling water inlet temperature via the temperature sensor 62, and controls the temperature of the cooling water flowing into the fuel cell 20 by controlling the cooling fan C13 on the basis of the detected cooling water inlet temperature. Such flow control and temperature control of the cooling water makes it possible to adjust the temperature of the fuel cell 20 within a predetermined temperature range.

When the fuel cell system is normally operated, the control section 50 determines whether or not abnormality occurs in the temperature sensor 61 for detecting the cooling water outlet temperature, at predetermined time intervals (abnormality determining step: S1). The method for determining whether or not abnormality occurs in the temperature sensor 61 includes a determining method based on an output change (for example, voltage/resistance change) of a disconnection/short circuit determining circuit installed in a sensor signal input section, and the like. When there is no abnormality, the control section 50 continues the above described normal operation, and adjust the temperature of the fuel cell 20 on the basis of the cooling water outlet temperature detected by the temperature sensor 61, and the like (normal state temperature adjusting step: S2).

On the other hand, when the control section 50 determines that abnormality occurs in the temperature sensor 61 (the cooling water outlet temperature cannot be detected) in the abnormality determining step S1, the control section 50 estimates the cooling water outlet temperature on the basis of the cooling water inlet temperature detected by temperature sensor 62 and the physical information (current value) relating to the power generation amount of the fuel cell 20 (outlet temperature estimating step: S3). In the present embodiment, an addition value map shown in FIG. 3 is used when the cooling water outlet temperature is estimated. For example, when the cooling water inlet temperature detected by the temperature sensor 62 is "50° C." and the current value of the fuel cell 20 is "$A_2$", an addition value (value to be added to the cooling water inlet temperature) is determined as "$T_3$° C." from FIG. 3. Thus, the cooling water outlet temperature in this case is estimated to be "50+$T_3$ (° C.)". Note that in the outlet temperature estimating step S3, the control section 50 suppresses the occurrence of an estimation error caused by the change of the supply amount of the cooling water by making the number of revolutions of the pump C1 constant.

Subsequently, the control section 50 controls the flow rate of the cooling water flowing into the fuel cell 20 by controlling the pump C1 on the basis of the cooling water outlet temperature estimated in the outlet temperature estimating step S3, thereby adjusting the temperature of fuel cell 20 (abnormal state temperature controlling step: S4). The control section 50 repeats a group of these steps during the operation of the fuel cell 20. Note that when the control section 50 determines that abnormality occurs in both the temperature sensors 61 and 62 and both of the cooling water inlet temperature and the cooling water outlet temperature cannot be detected in the abnormality determining step S1, the control section 50 stops the operation of fuel cell 20. In the group of these steps, the abnormality determining step S1, the outlet temperature estimating step S3, and the abnormal state temperature controlling step S4 correspond to the first step, the second step, and the third step according to the present embodiment, respectively.

In the fuel cell system 1 according to the present embodiment as described above, even when abnormality occurs in the temperature sensor 61 and the cooling water outlet temperature cannot be detected, it is possible to estimate the cooling water outlet temperature on the basis of the cooling water inlet temperature and the physical information (current value) relating to the operating states of the fuel cell 20. Thus, it is possible to adjust the temperature of the fuel cell 20 by controlling the flow rate of the cooling water flowing into the fuel cell 20 on the basis of the estimated cooling water outlet temperature. That is, it is possible to effect the temperature adjustment of the fuel cell 20 even when abnormality occurs in the temperature sensor 61.

Further, in the fuel cell system 1 according to the present embodiment as described above, even when abnormality occurs in the temperature sensors 61 and 62 and both of the cooling water inlet temperature and the cooling water outlet temperature cannot be detected, it is possible to stop the operation of the fuel cell 20, and to thereby reduce the possibility to give a damage to the fuel cell 20.

Further, the fuel cell vehicle according to the above described embodiment is provided with the highly reliable fuel cell system 1, and hence has high safety.

Note that in the above embodiment, an example is explained, in which the control section 50 determines the abnormality of the temperature sensor 61, and in which when abnormality occurs in the temperature sensor 61, the control section 50 estimates the cooling water outlet temperature. However, the fuel cell system may also be constituted in such a manner that the control section 50 determines the abnormality of the temperature sensor 62, and that when abnormality occurs in the temperature sensor 62, the control section 50 estimates the cooling water inlet temperature on the basis of the information relating to the cooling water outlet temperature and the physical information relating to the operating states of the fuel cell 20 (inlet temperature estimating step).

Figure 4:
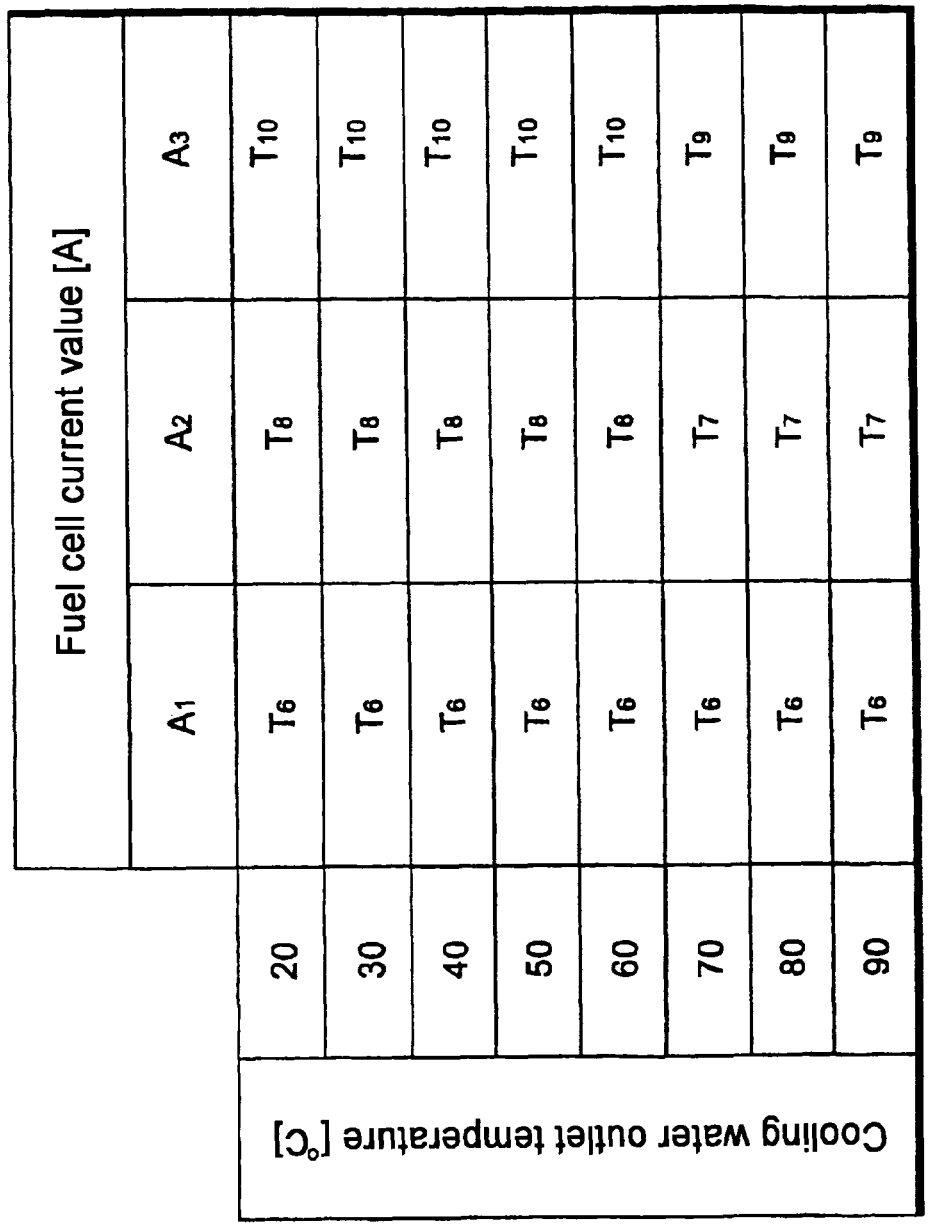
FIG. 4 shows a subtraction value map used for estimating a cooling water inlet temperature in the temperature adjusting method according to the embodiment of the present invention.

When the cooling water inlet temperature is estimated, a subtraction value map as shown in FIG. 4 can be used. For example, when the cooling water outlet temperature detected by the temperature sensor 61 is "80° C." and the current value of the fuel cell 20 is "$A_3$", a subtraction value (value to be subtracted from the cooling water outlet temperature) is determined as "$T_9$° C." from FIG. 4, so that the cooling water inlet temperature can be estimated to be "80–$T_9$ (° C.)". Then, the control section 50 controls the temperature of the cooling water flowing into the fuel cell 20 by controlling the cooling fan C13 on the basis of the estimated cooling water inlet temperature, thereby making it possible to adjust the temperature of the fuel cell 20 (abnormal state temperature adjusting step). The inlet temperature estimating step and the abnormal state temperature controlling step correspond to the fourth step and the fifth step according to the present embodiment, respectively.

Further, in the above embodiment, an example is described, in which the cooling water outlet temperature is estimated by using the information relating to the power generation amount of the fuel cell 20 (current value of the fuel cell 20 when power is generated), but the cooling water outlet temperature can also be estimated by using an electric power value and voltage value of the fuel cell 20, instead of the current value. Further, since there is a predetermined correlation between the power generation amount (current value) of the fuel cell 20 and the reaction gas supply amount (fuel gas supply amount and/or oxidizing gas supply amount) to the fuel cell 20, it is possible to estimate the cooling water outlet temperature by using the information relating to the reaction gas supply amount. Further, since there is also a predetermined correlation between the power generation amount of the fuel cell 20 and the load required for the fuel cell 20, it is also possible to estimate the cooling water outlet temperature by using the information relating to the required load.

INDUSTRIAL APPLICABILITY

The fuel cell system according to the present invention can be mounted on a fuel cell vehicle, as shown in the above embodiment, and can also be mounted on various movable bodies (robot, marine vessel, airplane, and the like) other than the fuel cell vehicle. Further, the fuel cell system according to the present invention may also be applied to a stationary power generation system used as power generation equipment for buildings (dwelling house, high rise building, and the like).

The invention claimed is:

1. A fuel cell system having a fuel cell, coolant circulating means which circulates a coolant into the fuel cell, a temperature sensor for outlet-temperature detection which detects a temperature of the coolant discharged from the fuel cell, and temperature adjusting means programmed to adjust a temperature of the fuel cell by controlling circulation states of the coolant on the basis of the temperature of the coolant discharged from the fuel cell, comprising:
   abnormality determining means programmed to determine whether or not the temperature of the coolant discharged from the fuel cell is incapable of being detected by the temperature sensor for outlet-temperature detection; and
   coolant temperature estimating means which, when the abnormality determining means determines that the temperature of the coolant discharged from the fuel cell is incapable of being detected by the temperature sensor for outlet-temperature detection, is programmed to estimate the temperature of the coolant discharged from the fuel cell on the basis of information relating to a temperature of the coolant flowing into the fuel cell and physical information relating to operating states of the fuel cell,
   wherein the physical information relating to the operating states of the fuel cell is information relating to a power generation amount of the fuel cell and/or information relating to an amount of reaction gas supplied to the fuel cell.

2. The fuel cell system according to claim 1, further comprising:
   a temperature sensor for inlet-temperature detection which detects a temperature of the coolant flowing into the fuel cell;
   wherein the abnormality determining means is programmed to determine whether or not the temperature of the coolant flowing into the fuel cell is incapable of being detected by the temperature sensor for inlet-temperature detection;
   wherein when the abnormality determining means determines that the temperature of the coolant flowing into the fuel cell is incapable of being detected by the temperature sensor for inlet-temperature detection, the coolant temperature estimating means is programmed to estimate a temperature of the coolant flowing into the fuel cell on the basis of information relating to a temperature of the coolant discharged from the fuel cell and the physical information relating to operating states of the fuel cell, and
   wherein the temperature adjusting means is programmed to adjust the temperature of the fuel cell by controlling the temperature of the coolant flowing into the fuel cell on the basis of the estimated temperature of the coolant flowing into the fuel cell.

3. The fuel cell system according to claim 1,
   wherein the information relating to the power generation amount of the fuel cell is information relating to at least one of electric power, voltage, and current of the fuel cell.

4. The fuel cell system according to claim 1,
   wherein the information relating to the amount of reaction gas supplied to the fuel cell is information relating to an amount of fuel gas supplied to the fuel cell and/or information relating to an amount of oxidizing gas supplied to the fuel cell.

5. The fuel cell system according to claim 1,
   wherein the fuel cell is constituted by laminating a plurality of unit cells performing power generation, and
   wherein the coolant temperature estimating means is programmed to estimate the temperature of the coolant discharged from the fuel cell by referring to at least one of a heat transfer rate from a power generating section in at least one of the unit cells to the coolant, a heat radiation amount of the unit cell, and a heat capacity of the fuel cell.

6. The fuel cell system according to claim 1, further comprising
   operation stopping means which, when the abnormality determining means determines that both of the temperature of the coolant flowing into the fuel cell and the temperature of the coolant discharged from the fuel cell cannot be detected, is programmed to stop the operation of the fuel cell.

7. A method for adjusting a temperature of a fuel cell system having a fuel cell, coolant circulating means for circulating a coolant into the fuel cell, and a temperature sensor for outlet-temperature detection for detecting a temperature of the coolant discharged from the fuel cell, the method comprising:
   a first step of determining whether or not the temperature of the coolant discharged from the fuel is incapable of being detected by the temperature sensor for outlet-temperature detection;
   a second step of, when it is determined in the first step that the temperature of the coolant discharged from the fuel cell is incapable of being detected by the temperature sensor for outlet-temperature detection, estimating a temperature of the coolant discharged from the fuel cell on the basis of information relating to a temperature of the coolant flowing into the fuel cell and physical information relating to operating states of the fuel cell; and a third step of adjusting a temperature of the fuel cell by controlling circulation states of the coolant on the basis of the temperature of the coolant discharged from the fuel cell estimated in the second step, wherein the physical information relating to the operating states of the fuel cell is information relating to a power generation amount of the fuel cell and/or information relating to an amount of reaction gas supplied to the fuel cell.

8. The method for adjusting the temperature of the fuel cell system according to claim 7, further comprising:

a fourth step of determining whether or not the temperature of the coolant flowing into the fuel cell is incapable of being detected by a temperature sensor for inlet-temperature detection;

a fifth step of, when it is determined in the fourth step that the temperature of the coolant flowing into the fuel cell is incapable of being detected by the temperature sensor for inlet-temperature detection, estimating a temperature of the coolant flowing into the fuel cell on the basis of information relating to a temperature of the coolant discharged from the fuel cell and the physical information relating to operating states of the fuel cell; and a sixth step of adjusting the temperature of the fuel cell by controlling the temperature of the coolant flowing into the fuel cell on the basis of the temperature of the coolant flowing into the fuel cell estimated in the fifth step.

* * * * *